No. 660,096. Patented Oct. 23, 1900.
N. H. P. FRANCIS.
FAUCET.
(Application filed Apr. 24, 1900.)
(No Model.)
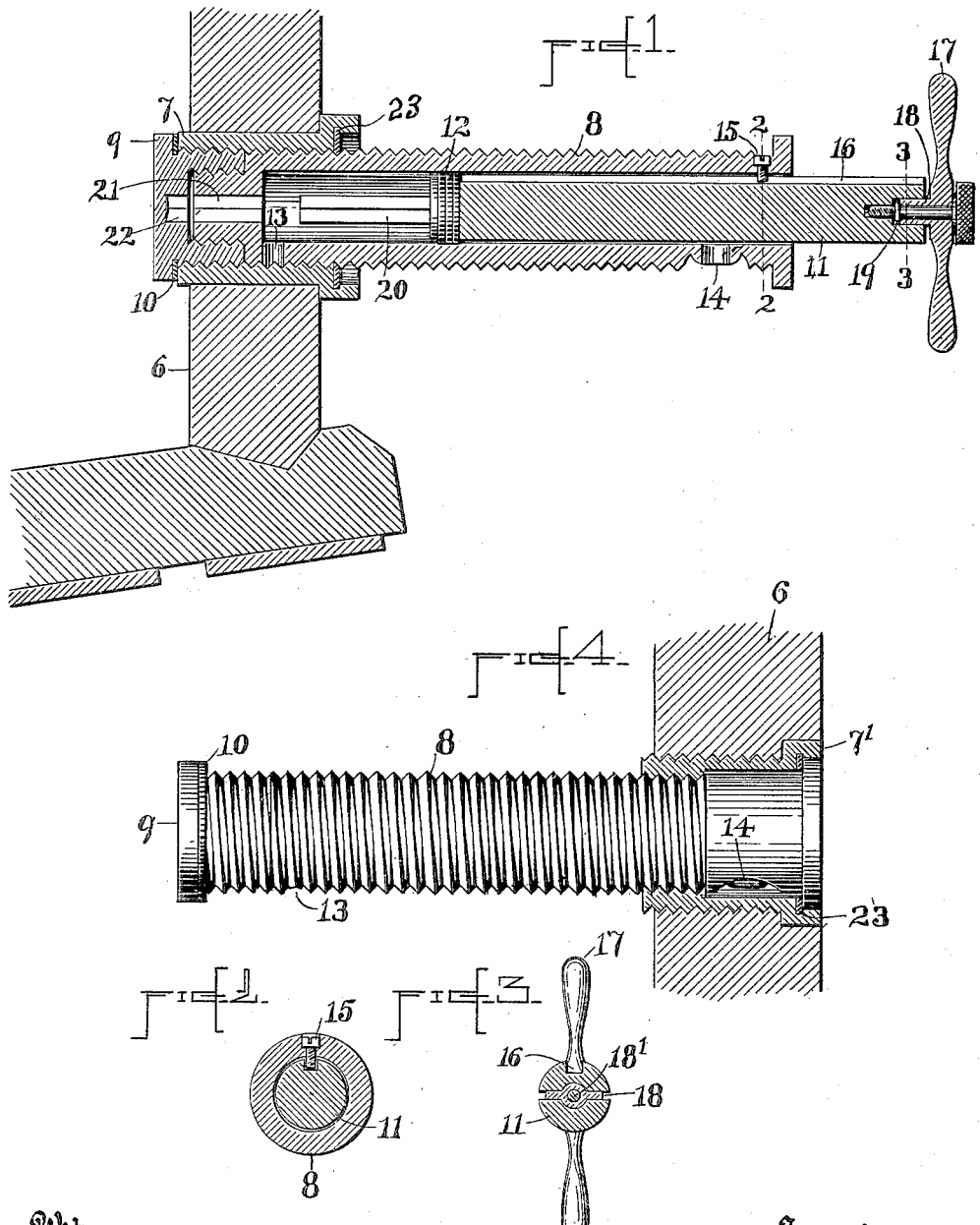
Witnesses:
Otto Greenberg
Ethel L. Lawler.
Inventor
Nina H. Piffard Francis
By J. C. Townsend
Attorney

UNITED STATES PATENT OFFICE.

NINA H. PIFFARD FRANCIS, OF NEW ROCHELLE, NEW YORK.

FAUCET.

SPECIFICATION forming part of Letters Patent No. 660,096, dated October 23, 1900.

Application filed April 24, 1900. Serial No. 14,137. (No model.)

*To all whom it may concern:*

Be it known that I, NINA H. PIFFARD FRANCIS, a citizen of the United States, and a resident of New Rochelle, in the county of Westchester and State of New York, have invented a certain new and useful Improvement in Faucets, of which the following is a specification.

This invention relates to faucets for barrels, casks, or other receptacles for liquid, and especially to that class of faucets constructed in a manner to be readily removable and which on being removed automatically actuate suitable means for closing the bung-hole.

The objects of the invention are to construct a faucet of the class above specified in a manner such that it may not only be removed from one cask and used in another, whereby one faucet will serve for any number of casks, but also to construct a faucet of this sort which, if desired, may after each using be entered into the interior of the cask, so that its outer end will not project beyond the surface thereof. A faucet constructed to fulfil both of these objects enables the manufacturer of barrels and casks to provide them with means by which the consumer may readily withdraw the contents without having to bore into them and fit a faucet thereto, and where a faucet is made to disappear within the cask it may be inserted when the cask is made and will be free from injury during the transportation of the cask.

With these objects in view the invention consists in the formation of parts and their combination, substantially as hereinafter described and claimed.

In the accompanying drawings, which form a part of this invention, Figure 1 represents in longitudinal section the preferred form of the faucet. Fig. 2 represents a section through the same taken on the line 2 2, and Fig. 3 represents another section taken on the line 3 3. Fig. 4 represents the faucet shown in Fig. 1 as it would appear when entered into a cask or barrel.

The faucet is shown as applied to a cask (indicated at 6) by means of a bushing, (indicated at 7.) It may, however, be directly applied to a bung-hole not provided with a bushing. When a bushing is used, it may be plain on its exterior surface, as shown in Fig. 1, or it may be screw-threaded, as shown in Fig. 4.

The faucet is indicated at 8, and a plug for closing the bung-hole bushing from inside the cask is indicated at 9. This plug is fitted to the bung-hole or push, preferably by a screw-thread, and a tight joint is made with the bushing by means of a suitable gasket, as indicated at 10. This plug is preferably provided with a screw-threaded socket and the faucet with a screw-threaded projection fitted to said socket. The faucet is also provided on its exterior with a screw-thread, and the screw-threads of the bushing, plug, and faucet are made of the same pitch, so that the faucet may be turned into the bushing and its projection entered into the plug, and when the shoulder on the faucet meets the end of the plug any further turning of the faucet will unscrew the plug and carry it into the cask.

The faucet is provided with a bore extending longitudinally thereof and into which is fitted a piston-plug 11, which takes the place of the turning-plug in the ordinary faucet. This piston-plug may be made to fit the bore of the faucet tightly by any suitable means—such, for instance, as a series of felt washers secured to the inner end thereof, as indicated at 12. The faucet has an inlet-port communicating with the bore thereof, as at 13, and an outlet-port, as at 14.

In order to insure the flow of liquid from the faucet in a solid stream, the outlet-port is preferably provided with a short tube, as indicated, the faucet being recessed or cut away to provide for the projection of said tube beyond the immediate surface of the faucet without making it so long as to project beyond the screw-threaded surface of the faucet. The piston-plug is preferably prevented from turning within the faucet, so that by means of any suitable handle applied thereto the faucet may be screwed into the cask or screwed out of the same. To accomplish this, a screw, as 15, may be inserted through the faucet and entered into a groove, as 16, in the side of the piston-plug. This screw will also serve as a stop against the withdrawal of the piston, since the head 12 will strike against said screw when the piston is drawn out to effect connection between the inlet-port 13 and the outlet-port 14. In order that no part whatever of the faucet may project beyond the surface of the cask when it is entered into the cask, the handle of the piston is made removable. This handle is, in effect, a key, since without it the faucet cannot be operated. This key is indicated at 17. It preferably has an angled or flanged shank 18, fitted to a corresponding socket in the end of the piston-plug, and in said shank and handle may be located a screw, as 18', which turns into a threaded socket in the piston-plug for holding the key in its socket. This screw is preferably retained in the handle, as by means of a collar 19 thereon at the end of the shank, and is provided with a milled head, as shown.

To positively insure the reseating of the plug 9 when the faucet is removed, a lock is provided to prevent said plug and faucet from turning one upon the other. This lock preferably consists of an angled projection, as 20, upon the inner end of the piston-plug, and in the end of the faucet an opening 21 is made, through which said projection may pass, a socket 22 being made in the plug to receive the end of said projection. The opening through the end of the faucet may or may not be angled to fit said projection. It is not necessary that it be angled when the stop 15 is used; but in the absence of such a stop said opening 21 should be angled to fit projection 20.

In Fig. 1 the interior screw-thread of the bushing is shown as extending from end to end thereof. Said bushing need only be screw-threaded for the distance corresponding to the length of the plug 9, as seen in bushing 7' in Fig. 4. This will facilitate the entry and removal of the faucet, though it may add to the cost of construction.

It is well to provide a gasket, as at 23, to insure a tight joint between the bushing and the faucet when the latter is secured to the interior of the cask.

The faucet is thus manipulated: When the cask is simply provided by the manufacturer with the bushing and plug 7 9, the consumer screws the faucet into the bushing until the projection on the faucet has been seated in the plug. The piston is then pushed in until the lock 20 is seated, thereby preventing any possibility of the threads on the plug and on the piston binding and preventing further movement of the faucet. Then the faucet is screwed farther until the port 13 passes beyond the bushing. The faucet is now in position to draw the contents of the cask, said contents being caused to flow by pulling the piston out until its head 12 passes the discharge-port 14, the further movement of the piston being checked by the stop 15. After drawing the quantity of liquid desired the faucet may be removed by first entering the lock 20 into the plug 9 and unscrewing the faucet until the plug is seated. Then by pulling out the piston until the lock is disengaged from the plug the faucet may be entirely unscrewed. If the manufacturer produces a cask with the faucet attached, said faucet will be in the position indicated in Fig. 4. The consumer then has simply to insert his key 17 and pull the piston out slightly, so that he may readily unscrew the faucet sufficiently to bring the discharge-port 14 into position for drawing the contents of the cask. The consumer may leave the faucet in this position, if desired, and by pushing the piston-plug in and withdrawing his key he can prevent others from drawing the contents of the cask without a key.

Other changes in the formation of parts and in the structure of the whole may be made, aside from those specified, without departing from the invention.

I claim as my invention—

1. The combination with a bushing of a plug fitted to the inner end thereof, a faucet adapted to be secured to said plug through the outer end of the bushing, and a piston-plug in the faucet provided with a projection for locking the faucet and plug together to prevent the movement of one upon the other.

2. The combination with a plug fitted to the inner end of a bung-hole and provided with a screw-threaded socket, of a faucet provided with a screw-threaded projection to fit the socket in the plug and means for locking the plug to the faucet at will to prevent either moving without the other and for unlocking them when desired.

3. The combination with a bushing, of a faucet adapted to be screwed into the bushing and when not in use to be screwed still farther into the bushing and projected into the barrel or other receptacle to which the bushing is attached, whereby the outer end of the faucet will not project beyond the surface of the receptacle.

4. A faucet adapted, when not in use, to be entered into the barrel until no part thereof projects beyond the barrel, and a key for moving the faucet out and in.

5. A faucet adapted to be screwed into a bung-hole and provided with a piston-plug, in combination with a key detachably connected to said piston and a projection extending from the faucet into a groove in the piston to prevent the piston from turning within the faucet.

6. The combination with an internally-screw-threaded bung-hole, of a plug fitted to its inner end and provided with a screw-threaded socket, a faucet fitted to the bung-hole and provided with a screw-threaded projection to fit the socket of the plug, and a piston-plug in the faucet provided with an angular projection adapted to pass through the end of the faucet into an angular socket in said plug, for the purpose set forth.

Signed at New York, in the county of New York and State of New York, this 16th day of April A. D. 1900.

NINA H. PIFFARD FRANCIS.

Witnesses:
DELBERT H. DECKER,
ETHEL L. LAWLER.